May 17, 1932.  A. VAN DUYN  1,858,795
WEIGHING APPARATUS
Filed July 31, 1931
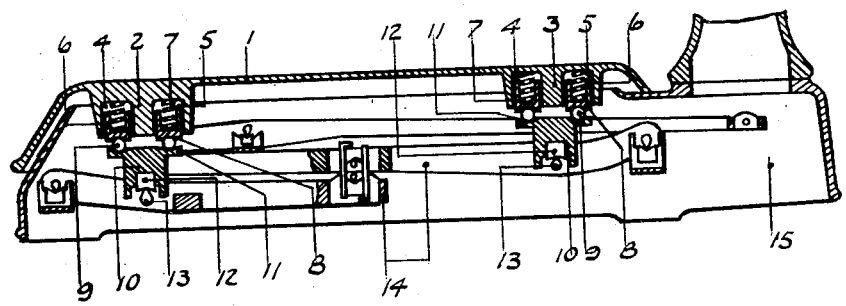
Inventor:
Adrianus Van Duyn
By Cheever, Cox + Moore
Attys.

Patented May 17, 1932

1,858,795

UNITED STATES PATENT OFFICE

ADRIANUS VAN DUYN, OF HILLEGERSBERG, NETHERLANDS, ASSIGNOR TO NAAMLOOZE VENNOOTSCHAP MAATSCHAPPIJ TOT VERVAARDIGING VAN SNIJMACHINES VOLGENS VAN BERKEL'S PATENT EN VAN ANDERE WERKTUIGEN, OF ROTTERDAM, NETHERLANDS, A LIMITED LIABILITY COMPANY OF THE NETHERLANDS

WEIGHING APPARATUS

Application filed July 31, 1931, Serial No. 554,297, and in Great Britain August 15, 1930.

This invention relates to weighing apparatus, particularly heavy capacity weighing scales, and its object is to provide an improved mounting for the platform or other part of the weighing apparatus subjected to shocks by the application of a load or weights, especially the application of heavy loads.

According to the invention, weighing apparatus is provided in which the platform or other part subjected to the load or weights is provided with a mounting or mountings comprising spring or other resilient means. More specifically, the mounting of the platform or other part subject to the load comprises a number of spring-buffer or cushioning devices, adapted to form a shock-absorbing arrangement between the platform or other part aforesaid and the weighing mechanism.

The mounting of the platform or other part subject to the load may comprise the combination of a shock-absorbing arrangement with the knife-edge bearing elements either of the said platform or part, or of the portion of the lever system on which the said platform or part is mounted, or with the bearing elements of both the said platform or part and the said portion of the lever system. Preferably, the mounting comprises a number of spring-buffer devices each interposed between a support on the platform or other part to which the load is applied, and knife-edge bearing on the weighing mechanism.

In accordance with a further feature of the invention, the resilient mounting or mountings of the platform or other part subjected to the load or weights may be used in conjunction with a ball or roller mounting. Preferably, this ball or roller mounting is interposed between the resilient mounting and a knife-edge bearing with which the resilient mounting is associated. For example, the balls of a ball mounting may be arranged between a member carrying one of the elements of the knife-edge bearing and the adjacent surface of one or more spring buffers arranged on the platform.

A preferred embodiment of the invention as applied to a scale pan or platform mounting will now be described, by way of example, with reference to the annexed drawing, which is a view of the embodiment in cross-sectional elevation.

Referring to the drawing:

The under-side of the platform 1 is provided with integral depending supports 2, 3. Each of these supports is provided with a pair of recesses 4, 5 of inverted cup-shape adapted to accommodate an inverted trunk-shaped plunger 6, between which and the bottom of the recess 4 or 5 a coil spring 7 is arranged. The outer surface 8 of each inverted spring-pressed plunger 6 is made of slightly concave shape and is adapted to rest on a ball 9 supported from below by a bearing block 10. The upper surface of this block is provided with two shallow dished portions 11 forming seatings for the two balls 9 associated respectively with the pair of plungers 6 arranged in each individual depending support 2, 3. Each bearing block 10, in turn, is fitted with an inverted bearing member 12 of a knife-edge bearing, the knife-edge member 13 of which is mounted on the lever system 14 of the apparatus. As shown, the supports 2, 3, plungers 6, balls 9 and bearing blocks 10 are located along with the lever system 14 in the base casing 15 of the scale.

By this invention, little or no shock is transmitted from the platform to the weighing mechanism, and thus the liability of the scale to get out of order due to heavy loads being applied, or loads or weights being applied suddenly, is lessened and the life of the scale is prolonged.

I claim:—

1. Weighing apparatus having, in combination, platform means, weighing mechanism adapted to carry said platform means, a resilient mounting for said platform means upon which said platform rests, and antifriction bearing means arranged between said platform means and weighing mechanism.

2. Weighing apparatus having, in combination, a platform, a weighing lever system, knife-edge bearings on said lever system, a spring mounting for said platform, and an anti-friction mounting interposed between said spring mounting and anti-friction mounting.

3. Weighing apparatus having, in combination, a platform, a weighing lever system, knife-edge bearings on said lever system, a spring buffer mounting for said platform, and a ball mounting between said spring buffer mounting and knife-edge bearings.

4. Weighing apparatus having, in combination, a platform, a weighing lever system, knife-edge bearings on said lever system, ball mountings on said bearings, recessed supports on said platform, compressible springs arranged in recesses in said supports, and buffer members arranged between said springs and said ball mountings.

In testimony whereof I affix my signature.

ADRIANUS VAN DUYN.